United States Patent
McRae

(10) Patent No.: US 9,445,038 B2
(45) Date of Patent: Sep. 13, 2016

(54) PREDICTIVE TIME TO TURN ON A TELEVISION BASED ON PREVIOUSLY USED PROGRAM SCHEDULES

(71) Applicant: Vizio Inc, Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 310 days.

(21) Appl. No.: 14/168,733

(22) Filed: Jan. 30, 2014

(65) Prior Publication Data

US 2015/0215566 A1     Jul. 30, 2015

(51) Int. Cl.
    *H04N 5/63*     (2006.01)
    *H04N 5/50*     (2006.01)
    *H04N 21/443*     (2011.01)
    *H04N 21/442*     (2011.01)
    *H04N 21/466*     (2011.01)

(52) U.S. Cl.
    CPC ............... *H04N 5/63* (2013.01); *H04N 5/505* (2013.01); *H04N 21/4432* (2013.01); *H04N 21/4436* (2013.01); *H04N 21/44222* (2013.01); *H04N 21/4667* (2013.01)

(58) Field of Classification Search
    CPC .................... H04M 21/4436; H04M 21/4667; H04M 5/505; H04M 5/63
    USPC ........ 348/730, 731; 713/324, 320, 323, 310, 713/300; 455/127.5, 574; 372/38.04, 372/29.021
    See application file for complete search history.

(56) References Cited

U.S. PATENT DOCUMENTS

| | | | |
|---|---|---|---|
| 5,954,820 A | 9/1999 | Hetzler | |
| 5,991,827 A | 11/1999 | Ellenby et al. | |
| 6,098,118 A | 8/2000 | Ellenby et al. | |
| 6,885,974 B2 | 4/2005 | Holle | |
| 6,892,313 B1 | 5/2005 | Codilian et al. | |
| 6,961,859 B2 * | 11/2005 | Derocher | G06F 1/3203 710/15 |
| 7,100,062 B2 * | 8/2006 | Nicholas | G06F 1/3228 713/300 |
| 7,430,675 B2 | 9/2008 | Lee | |
| 7,546,477 B2 | 6/2009 | Breen et al. | |
| 7,788,219 B2 | 8/2010 | Harris | |
| 8,311,754 B2 | 11/2012 | Alles | |
| 8,316,253 B2 | 11/2012 | May et al. | |
| 2004/0032605 A1 | 2/2004 | Regimbal | |
| 2006/0259803 A1 | 11/2006 | Edwards et al. | |
| 2010/0115309 A1 | 5/2010 | Carvalho et al. | |
| 2012/0274479 A1 | 11/2012 | Moon et al. | |

* cited by examiner

*Primary Examiner* — Paulos M Natnael
*Assistant Examiner* — Jean W Desir
(74) *Attorney, Agent, or Firm* — Law Office of Scott C Harris, Inc

(57) ABSTRACT

A television has first and second electronic subsystems which collectively operate to produce a display. The television is controlled by a processor, the processor also operating to determine a period of time where no output is being produced, and to maintain the first electronic subsystem and said second electronic subsystem into a power reduced state, e.g., a sleep state. The television maintains a database of times when it is likely to operate to produce said output, and automatically removing the first electronic system from the power reduced state, and not removing the second electronic subsystem from the power reduced state at one of the times, and without an indication.

24 Claims, 9 Drawing Sheets

PREDICTIVE TIME TO TURN ON A TELEVISION BASED ON PREVIOUSLY USED PROGRAM SCHEDULES

BACKGROUND

At the beginning of the large screen digital televisions, the amount of power used by them was about on the same level with household irons. Plasma televisions at one time used between 900 and a kilowatt of power depending on the screen size. The introduction of LCD large screen televisions substantially cut that power requirement. Typical large screen LCD televisions then used on the order of 100 watts of power when operating and somewhat less than 2 or 3 watts in standby mode.

Standby power consumption has dropped substantially over the past 10 years. Digital televisions previously turned off power to the display screen when the user would "turn off" the device. In a continual quest to save power, televisions often now turn off power to complete subassemblies.

Televisions generally contain multiple microprocessors for managing digital content. Many times a single chip will contain multiple processing cores much like the multi core processing chips in desktop, laptop and tablet computers.

Televisions with multi-core processing chips will generally put some or all of the processors to sleep or into what is known as deep sleep or hibernation mode. When the processors are put to sleep, the processor clock is generally reduced in frequency or completely stopped. Also, power is generally removed from dynamic random access memory. Once the memory and processors loose power, the operating system that controls the processors is lost. When the user "turns on" the television, power is restored to the memory and to the processor(s). When this happens the processor has to be rebooted which includes moving the operating system(s) from flash memory to faster dynamic memory. The process of rebooting can take anywhere from tens of seconds to over a minute. Times of tens of seconds has the appearance to users of being an inordinate amount of time.

SUMMARY

The present invention reduces the amount of time the user has to wait for the television to become active. The amount of time it should take the television to "come alive" should be on the order of less than a second which improves the viewing experience for the user. A secondary advantage of the present invention is that wake-up times as determined by the invention become more refined as time passes.

The present invention defines a method, system and apparatus which monitors user's electronic programming guide selections to partially or fully bring a television out of a sleep or hibernation state to a near operational or operational state based on long term program selections from an electronic programming guide.

One aspect of the invention includes a database that captures user initiated turn on times and program selections of the television. The database engine processes the database when the user turns the device off and makes a determination of when the device is most likely to be turned back on based on historical program selections. The determination results in the device being placed into a deep sleep or hibernation state, and brought back to a near operational state when it is determined that the user is most likely to want to turn the device back on.

BRIEF DESCRIPTION OF THE DRAWINGS in the drawings.

DETAILED DESCRIPTION

Figure 1A:
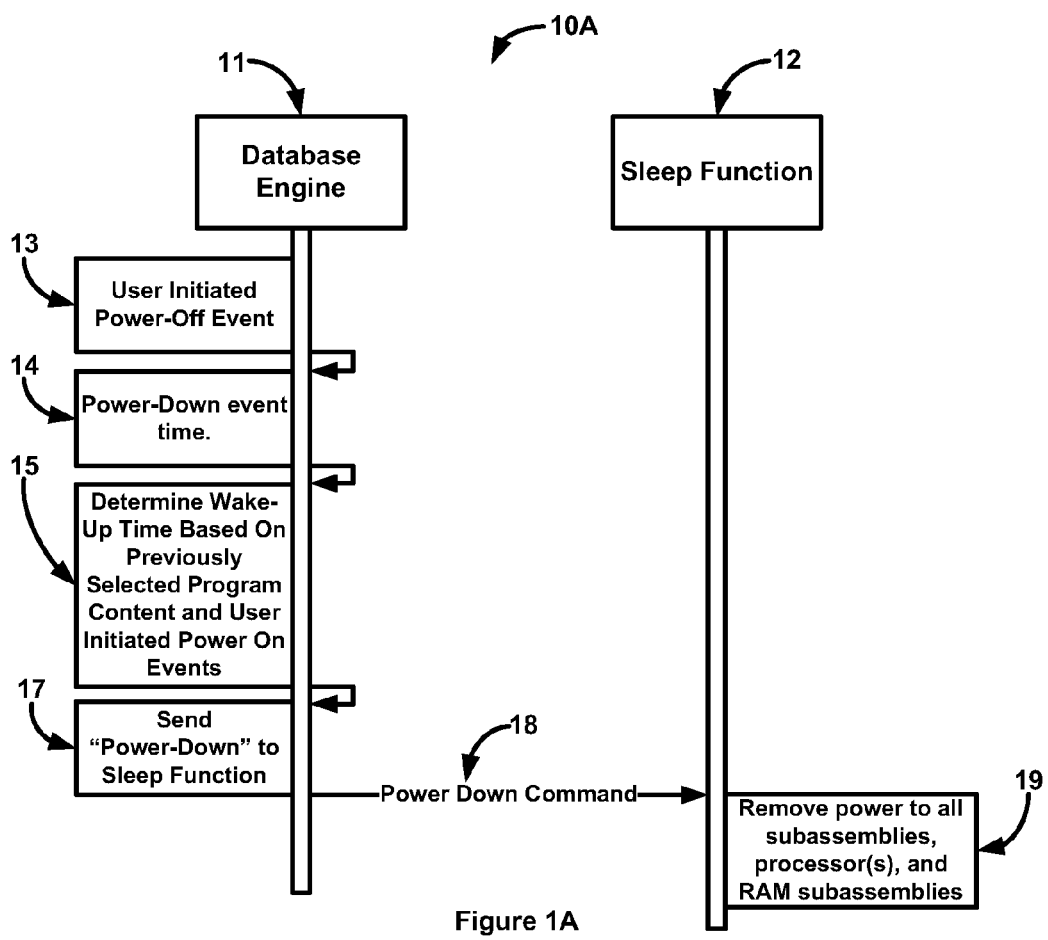
FIG. 1A is a schematic depiction of processing a user initiated power-off event and determining a wake-up time and selection of source content.

The inventor recognizes that televisions and other consumer electronic (CE) devices are in a constant quest to reduce power consumption. In the recent past, when a device such as a television was turned off only the display screen was powered down. Generally, the supporting electronics continued to operate and consume power. Today some intelligence has been incorporated into CE devices in that digital electronics with microprocessors can reduce or remove power from subassemblies within the device. Some devices can set wakeup timers so that microprocessors can periodically "wake up" and check to determine if a button press or switch closure has occurred. When wake up events, such as button presses or switch closures are detected, wake up circuits will cause the microprocessor to boot up and begin executing their operating system.

The time to boot an operating system can take anywhere from tens of seconds to a minute or more which, to a user, can appear to be inordinate amounts of time.

The inventor recognizes the need for a device to make a determination as to when a user is most likely to want to use the device and have the device perform a wakeup such that when the user turns on the device the device will quickly or instantly turn on the display screen and audio and begin operation.

Embodiments to reduce the time for a television to become operational from the perspective of the user include the following.

In a preferred embodiment, the invention has a database engine and a database that collects an increasing number of samples of user program selections. In this preferred embodiment, the database will contain a plurality of data such as program selection and date and time for every user initiated power-on and power-off event.

When the database engine makes the determination for when the user will next turn on the television based on the user's previous power-on event and selections of programs from an electronic programming guide, the database engine, prior to directing the television to enter a sleep or hibernation mode, sets a wakeup timer for the predicted wake-up time less the amount of time required for the microprocessors to reboot and for initialization of other hardware subassemblies and software modules.

The wakeup event may or may not, based on a preset user's option, turn on the television display screen or leave the display screen dark and the audio muted until the user presses the power-on button. In this embodiment, the user is not aware that the television is ready to display content until they press the power-on button at which time the display screen comes alive, audio is unmuted and content is presented.

There are several possible additional embodiments associated with the wakeup event. These additional embodiments may change how the display screen and audio are turned on. The first of these associated embodiments keeps the display screen electronics, tuner and/or input ports, audio and video decoders and the backlight in a hibernation or sleep state. In this embodiment, the balance of the television electronics is powered up and ready to begin decoding and displaying content once the user presses the "power-on" button. This embodiment will, when the power-on sequence is initiated by the user, turn on the display screen backlight, control electronics (row and column logic and screen driver electronics), tuner and/or input ports and the video and audio decoders. These subsystems will take anywhere from 1 to several seconds to begin decoding a digital content stream once the stream is initiated by the tuner or the preselected input port.

An advantage of this embodiment is that the time required to present content to the viewer, once the power button is pressed, is substantially reduced.

A next of the associated embodiments also powers on all of the electronics in the television with the exception of muting the audio and the keeping the backlight for the display screen in an off state. This embodiment provides the user with an instant on experience. When the user initiates a power-on event, the only subsystem that needs power is the backlight and the audio will be unmuted. This embodiment allows the user to start a viewing experience in less than a second.

In another preferred embodiment, if the user is gone for an extended period of time, such as a vacation that lasts several days to several weeks, the database engine will take note of each day that the user never initiates a power-on event after an automated wake-up was waiting for a user initiated power-on event. The database engine will after some predetermined number of days, not perform a wake-up event. On the first day that the user again initiates a power-on event, the database engine will revert to performing predicted wake-up events.

In another embodiment, there is a user option to perform a complete wake-up including turning on the backlight, unmuting the audio, and selecting the most likely channel that the user would have selected. This allows the television to be presenting content to the user immediately after the predicted wake-up. For example, the user may always turn on their television when arriving from work and always set the channel to a favorite program selected from an electronic program guide. In this embodiment, the television completely turns on and the selected program content is being displayed when the user arrives home from work or wakes-up first thing in the morning.

In a related embodiment, there is a user option to perform a complete wake-up including turning on the backlight and selecting the most likely internet URL that the user would have selected from a program guide for internet based program content. This allows the television to be presenting content to the user immediately after the wake-up. For example, the user may always turn on their television when arriving from work and always select an internet URL for a favorite streaming content provider. In this embodiment, the television would be on with the selected content being displayed when the user arrives home from work or wakes-up first thing in the morning. This embodiment works well for the case where a television is connected to a cable or satellite set top box and to the internet through a wired or wireless connection. This embodiment can display program content from streaming web sites such as a news network like CNN™, CBS™ or other live streaming web sites.

These embodiments will be described in detail in the following detailed description of the invention accompanied by the drawings for examples.

Figure 4:
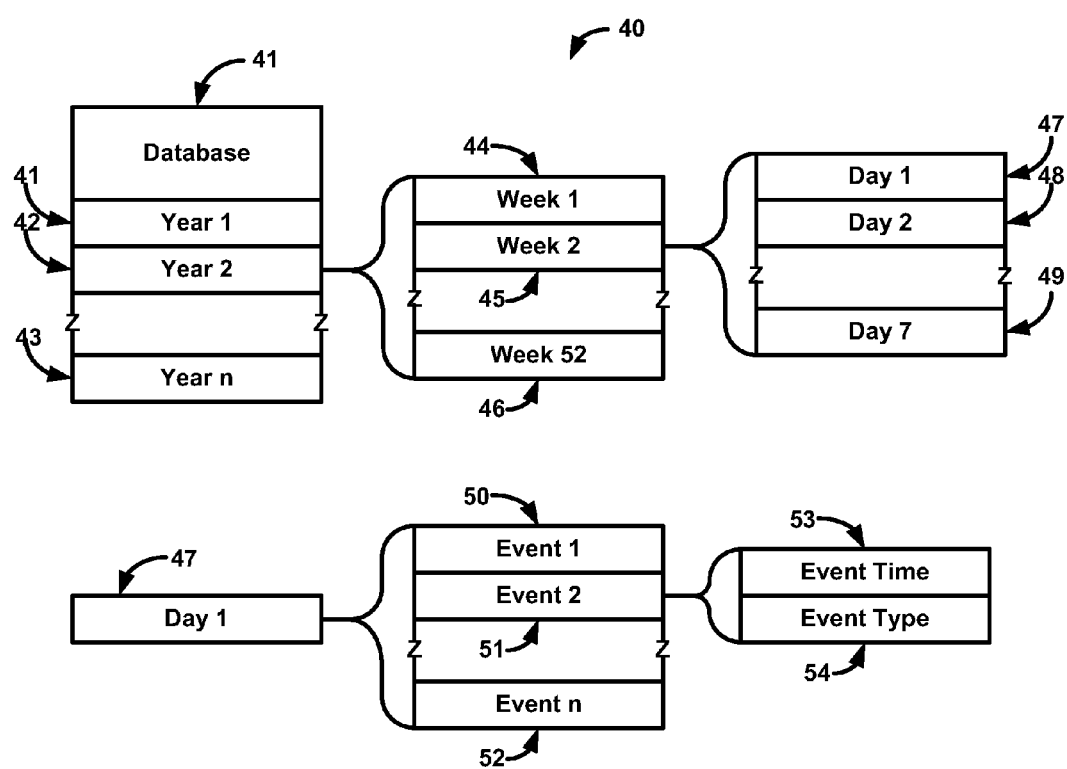
FIG. 4 is a depiction of the power on and off database.

Now referencing FIG. 4 where 40 depicts an example of a database that can be used for the embodiments. An actual database used by the embodiments may have more or fewer entries and may track many more or fewer events. Database 41 is a hierarchical database where years of data represented by year 1 41, year 2 42 and year 'n' 43 is shown. The database depicted in 40 contains at least 3 years of data for the depiction. Year 2 42 contains entries for week 1 44 through week 52 46. For this depiction, week 2 45 is further broken down into days of week with day 1 47, day 2 48 and day 7 49. Day 1 47 is shown as containing event 1 50, event 2 51 and event 'n' 52. Event 1 50 is further shown as containing event time 53 and event type 54.

Event type 54 contains a data whose value describes the event type. For example, event type 54 may be a wake-up timer event, a user initiated power-on event, a user initiated power-off event or a television power-off event or any other possible event which may be thought off in the future such as a channel change event while the television is already in an "ON" state.

When the database engine receives notification of an event, it makes an entry in the database and transverses the database starting with the year, month, week and day. The current event notification is stored as the next event along with a time stamp of the event. For example, if the current event for day 1 47 was event 2 51 then event time 53 and event type 54 is the current event just saved.

Now referencing FIG. 1A where depiction 10A is a power-off event initiated by the user. In this depiction, database engine 11 receives power-off events initiated by the user through the hand held remote control or a power button on the television. In this depiction, database engine 11 receives user initiated power-off event 13. Database engine 11 then executes power-down event time 14. This action causes the database engine to transverse the database to the current day and enter the current event as depicted for event time 53 and event type 54.

Database engine 11 then executes determine wake-up timer based on previously selected program content and user initiated power on events 15 where it determines the optimal automatic wake-up time for the television. To accomplish this, database engine 11 searches the database for wake-up times for the current day of the week over a previous predetermined range or period of time and notes the content that was viewed or selected. For example, the database search may extend over the previous year or some other shorter or longer range or period of time. Database engine 11 then transfers control to send "power-down" to sleep function 17.

Send "power-down" to sleep function 17 formats and sends power down command 18 to sleep function 12 processing block 19 remove power to all subassemblies, processor(s) and RAM subassemblies. This processing block then performs an orderly shutdown of power to subassemblies in the television and may turn off power to the processor cores. In some televisions power will not be removed from the processor cores but the clock signal to the processor cores may be slowed down or turned off.

At this point the television, with the exception of the wake-up time logic, will be in a sleep or hibernation state.

Figure 1B:
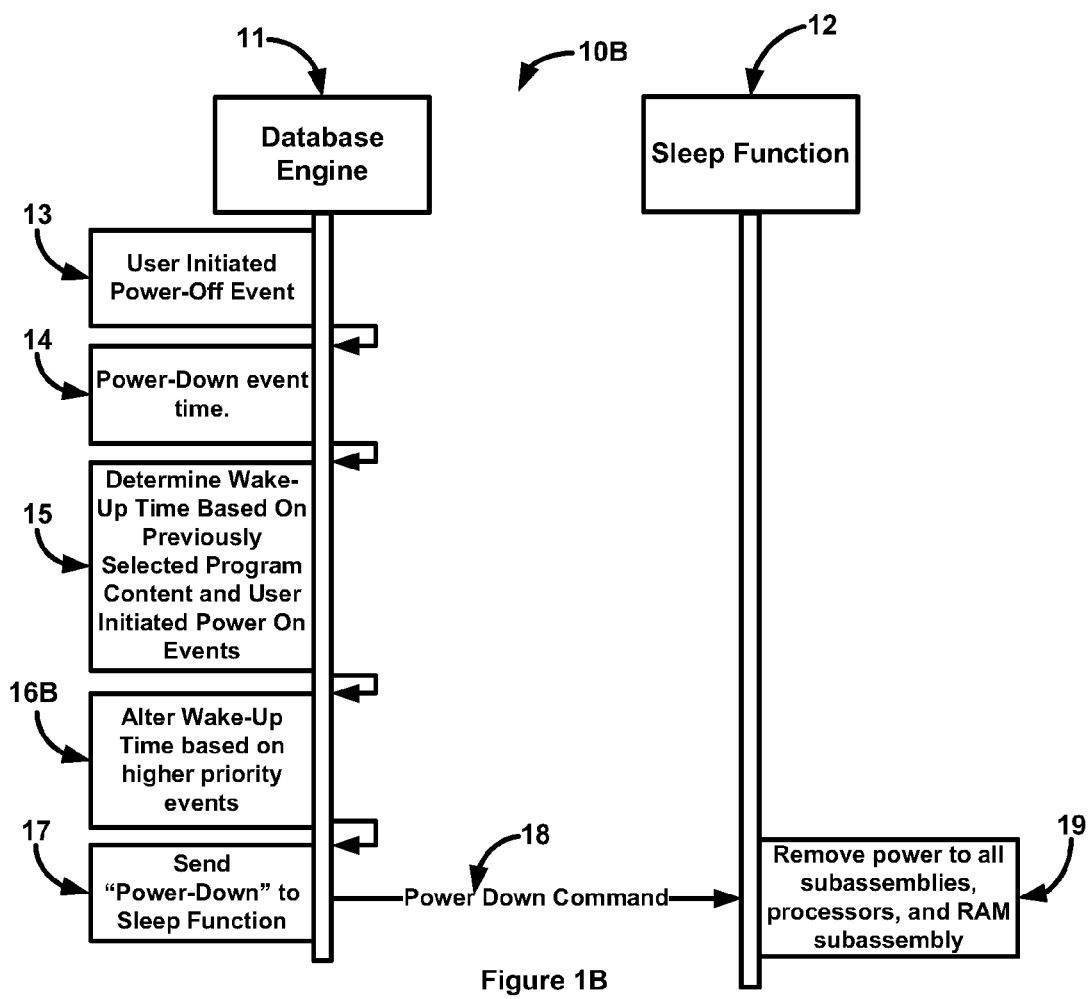
FIG. 1B is a schematic depiction of processing a user initiated power-off event and determining a wake-up time where an earlier wake-up time is made based on special programming.

FIG. 1B shows how high priority viewing events are maintained in a list of events for such programs as Super Bowl, Oscar Presentations, Emmy Awards, Country Music and other events which may be determined and selected by the user or by some ratings service. These can be part of the additional processing 168 in FIG. 1B. These events will be entered into the database through database engine 11 in the year, week, day and time entries. In the event of a conflict between a determined automatic wake-up time and a high priority viewing event, the high priority viewing event will have preference. For example, the Oscars Awards show for 2014 is scheduled for March 2nd at 4 pm pacific time. If on March 1st, the user initiated a power-off event the database engine would make a determination for an automatic power for March $2^{nd}$ at the time of the high priority event. If the initial scheduled wake-up time was for 4:00 pm Pacific time and the channel for (Orange County, Calif.) was BBCA (Top Gear) and the database engine discovered that a high priority viewing event was on at the same time, it would substitute the high priority view event for the wake-up event.

Figure 2A:
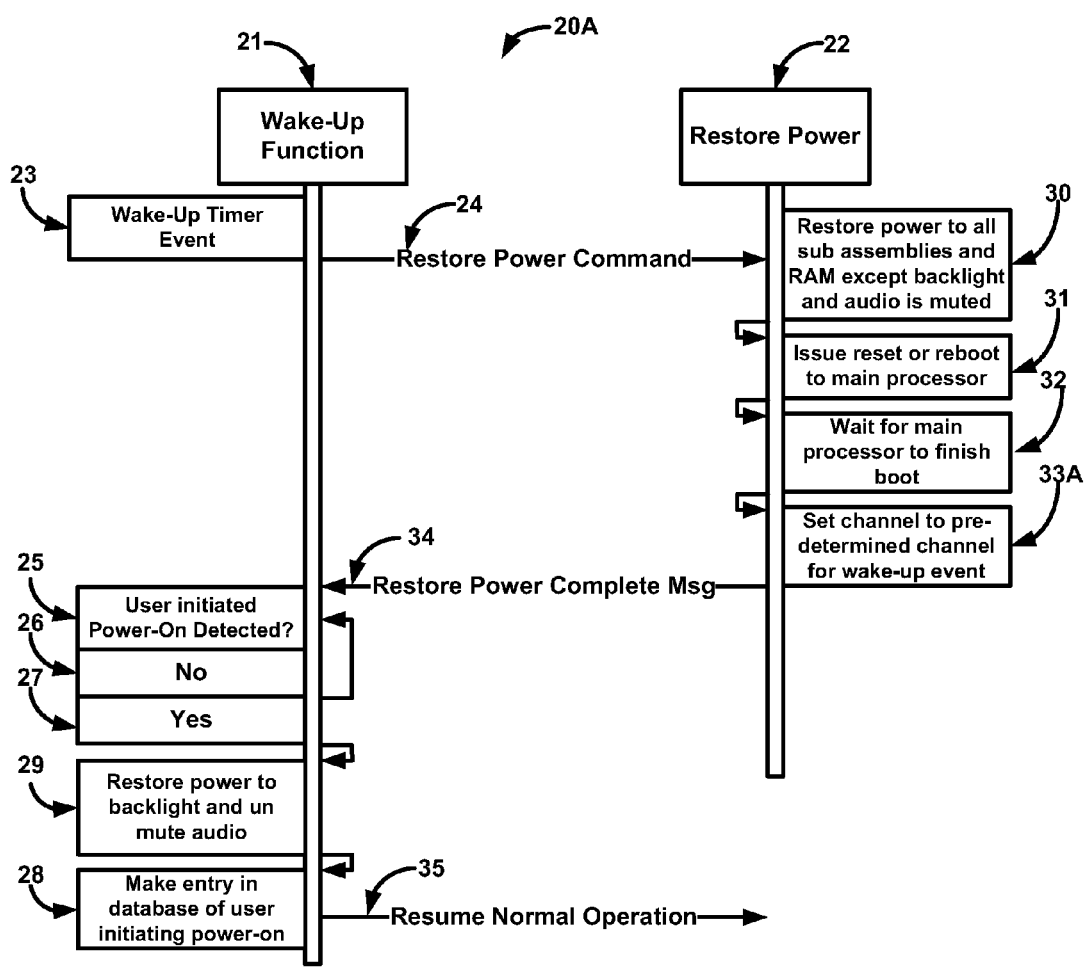
FIG. 2A is a schematic depiction of a wake-up timer event followed by a user power-on event where the channel is already selected.

Now reference FIG. 2A where a wake-up event as initiated by the wake-up timer is described. In this depiction 20A depicts wake-up function 21 and power restore function 22. When wake-up timer event 23 occurs, some amount of power is automatically restored causing a restore power event command 24 to be sent to restore power function 22. When restore power function 22 receives the restore power event command 24, logic block 30 restores power to all subassemblies and RAM except backlight and audio which is muted. Logic block 31 then issues a reset or reboot to the main processor core. This action allows the main processor to bootstrap itself and move the operating system from flash memory to faster RAM memory. Logic block 32 waits until the main processor has booted itself and then passes control to logic block 33A. Set channel to pre-determined channel for wake-up event 33A initiates a channel change to the pre-determined channel and sends restore power complete msg 34 to user initiated power-on detected 25.

At this point in the depiction, the television is operational with the exception of the backlight being off and the audio muted. Logic block 25 polls for a power-on command received from the user's hand held remote or for a power-on button press on the television. If the polling period times out a determination is made by logic block 26 that a power-on command was not received (NO) in which case control is transferred back to logic block 25 where it begins polling again. If logic block 27 (YES) determines that a power-on command was received, control will be transferred to logic block 29 where power to the backlight and the audio is unmuted will be executed. At this point the display screen is enabled and can start displaying content and logic block 29 exits to resume normal operation 35 after which control is transferred to Make entry in database of user initiating power-on 28 where it will make an entry in the database of the user initiating a power-on event. The user initiated power-on event will be entered in the database the same as that describe for FIG. 4 above. The event type entered in the data base will be a unique code for wake-up events where the user initiated a power-on event after the wake-up timer caused the television to be woken-up.

After the database entry for the user initiated power-on event has been made in logic block 28, control will be transferred to resume normal operation 35.

By enabling the electronic circuits in the television to begin operation then waiting until the user actually initiates a power-on event, the database engine can refine the amount of time the television will be asleep. This refinement is made over days, weeks, months and years. Since user initiated power-on events are tracked by time, there may be several power-on events over the course of a given day and each may be different depending on the day of the week. For example, if the user normally wakes up at 6:00 am and turns on a particular news program or weather or any other reoccurring program, the database engine over a period of time has the daily wake-up time determined to be 6:00 am and expects the user to turn off the television prior to their going to work at say 7:00 am at which time the television will enter the deep sleep or hibernation mode when the user initiates the power-off event. At this point the television remains in deep sleep until a wake-up event is initiated at the time the user is expected to initiate a power-on event for the evening.

Week-end times for use of the television would normally be expected to be different than those for week-days. Since the database engine knows the difference between week-days and week-ends it computes the wake-up times for week-end-days differently from week-days. For week-end-days computations, the database engine only looks at past histories for say Sundays, day 1 of the week and Saturdays, day 7 of the week. Assuming that the user will "sleep in" on week-ends, the television remains in deep sleep mode longer. Likewise, the database engine can also be aware of holidays and equate wake-up times for holidays predicated by the same holiday in the past even though holidays regularly occur on different days of the week from year to year.

Figure 2B:
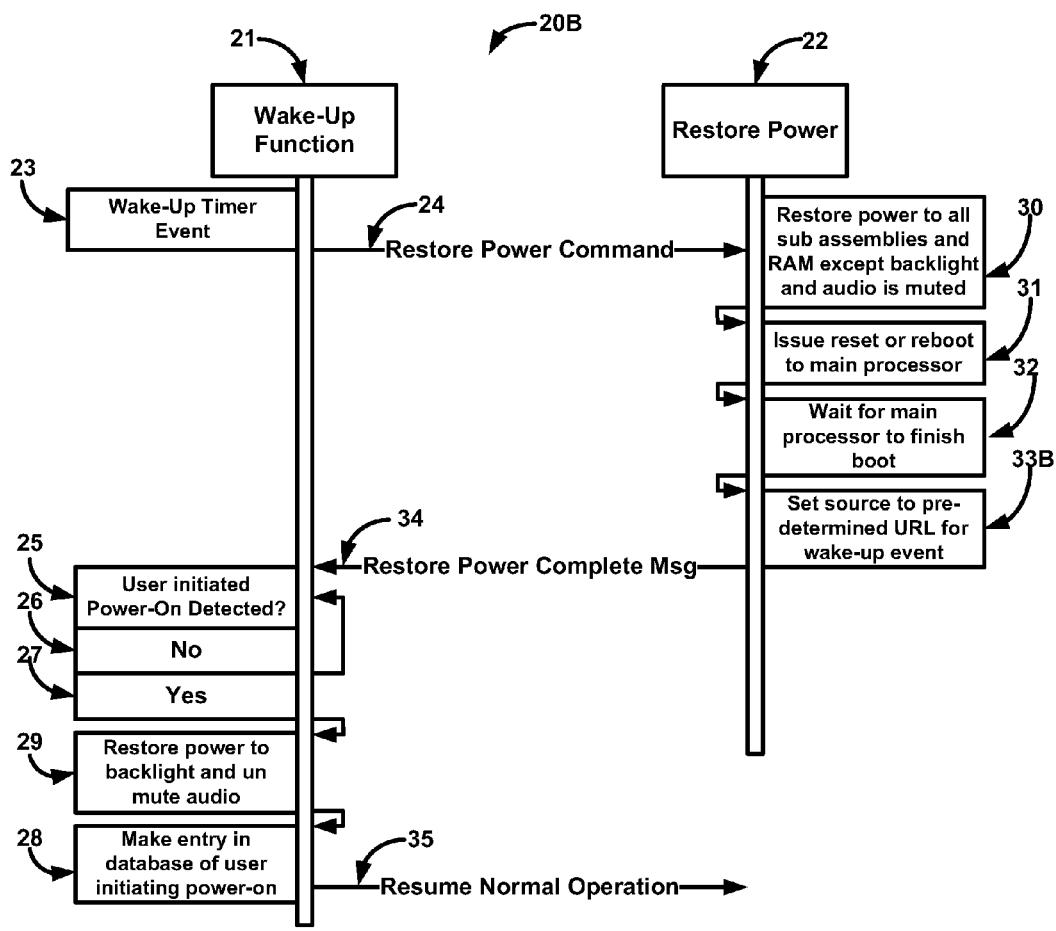
FIG. 2B is a schematic depiction of wake-up timer event followed by a user power-on event where an internet URL is already selected for streaming content.

FIG. 2B shows a slightly different embodiment to that in FIG. 2A, where the user may set an option whereby the television will, upon the database engine initiated wake-up, also results in the television backlight being powered on and a determined source channel being selected such that the television is completely operational at the conclusion of the wake-up event.

Now referencing FIG. 2B which is identical to FIG. 2A with the exception of logic block 33B where an internet URL is substituted for a predetermined channel. In this embodiment, if the user had previously selected a URL for viewing then that event would have been captured in the database and when the database engine searches for content for this time period it selects the most likely URL the viewer would have selected.

Figure 3A:
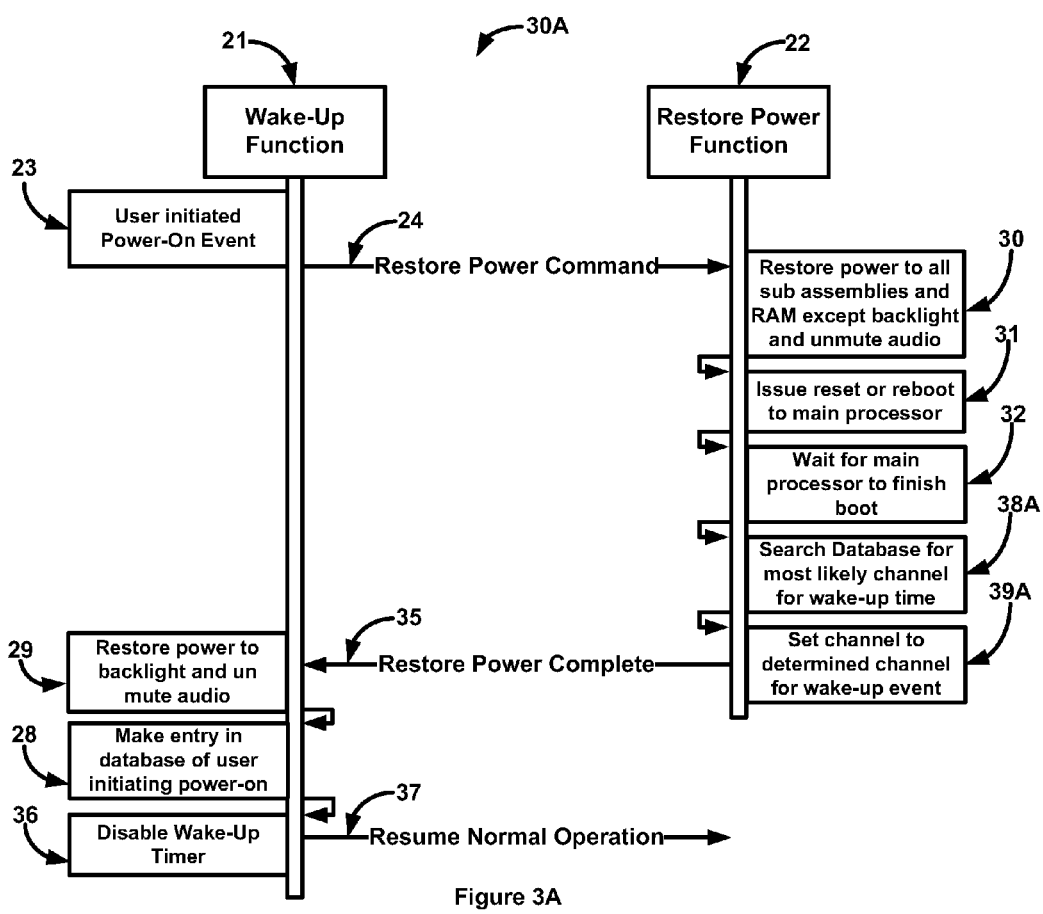
FIG. 3A is a schematic depiction of a user power-on event prior to the wake-up timer event where a channel is already selected.

Now referencing FIG. 3A which depicts a user initiated wake-up event that takes place prior to the wake-up timer initiating an automated wake-up. In this depiction 30A shows wake-up function 21 and restore-power function 22. If the user presses the power button on their hand held remote or presses the power button on the television, an event notification is sent to logic block user initiated power-on event 23 which causes logic block 23 to send restore power command 24 to logic block 30 of restore power function 22. Logic block restore power to all subassemblies and RAM except backlight and unmute audio 30. Issue reset or reboot to main processor 31 is then executed which starts the boot process. This action allows the main processor to bootstrap itself and then move the operating system from flash memory to the faster RAM memory. Logic block 32 will wait until the main processor has booted itself and will then pass control to search database for most likely program for wake-up time 38A. When the user initiated the wake-up event, the database engine searched its history to determine the most likely channel the user would select for the current time period. After the database engine has made its determination, control is passed to set channel to determined channel for wake up event 39A. This will cause the most likely program channel the user will want to view to be selected after which logic block 39A will send restore power complete msg 35 to logic block 29 where power is restored to the backlight and the audio is unmuted after which control is transferred to logic block 28 which makes an entry in the database of the user initiating a power-on event.

The user initiated power-on event is entered in the database the same as that described for FIG. 4 described above. The event type for this entry is different than the event type as described in the detailed description for FIG. 2. The event type entered in the data base for this event will be a unique code for wake-up events where the user initiated a power-on event before the wake-up timer caused the television to be woken-up. After the database event has been logged control transfers to logic block disable wakeup timer 36 which turns off the wake-up timer after which resume normal operation 38 is executed.

Figure 3B:
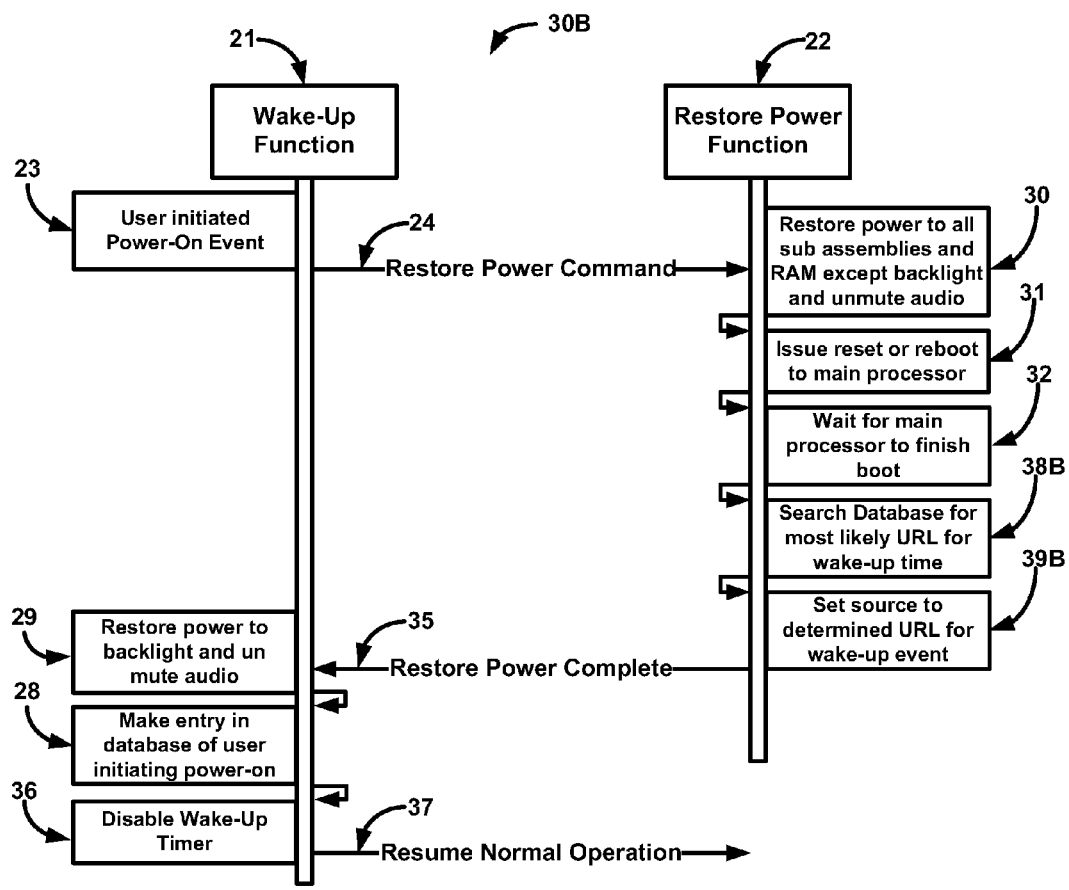
FIG. 3B is a schematic depiction of a user power-on event prior to the wake-up timer event where a URL is selected based on time of the event.

Now referencing FIG. 3B which is identical to FIG. 3A with the exception of logic block 38B and 39B where an internet URL is substituted for a predetermined channel. In this embodiment, the user would be expected to select a URL for viewing based on database history. When the database engine searches for content for this time period it will select the most likely URL the viewer would have selected.

Figure 5:
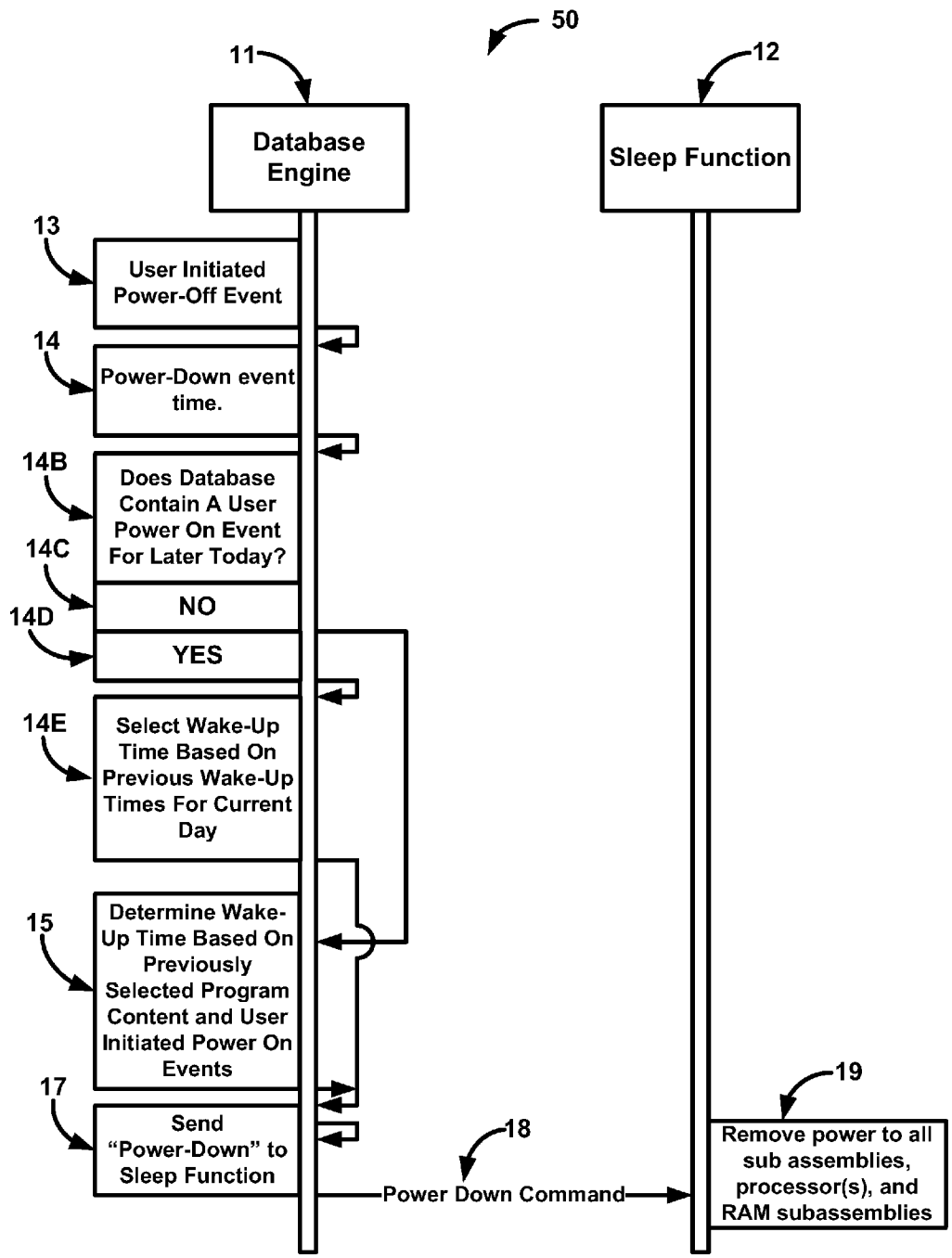
FIG. 5 is a depiction of an embodiment where the database engine, when determining when a wake-up should be scheduled, searches for previous wakeup events for a later time on the same day the power off event is initiated.

Now referencing FIG. 5 where 50 depicts depicts an embodiment where database engine 11 searches to determine if a wake-up event has previously occurred for later in the current day. In this embodiment, logic block 13 detects a power-off event initiated by the user. Logic block 13 operates, once the event has been received, to transfer control to logic block 14 power-down event time where the time of the current power-off will be logged in the database after which control will be transferred to logic block 14B does database contain a user power on event for later today? Logic block 14B will search the database entries for the current day of the week looking for a power-on event. If there were no power-on events for later in the current day in the history, control will fall through to logic block 14C NO which will transfer control to logic block 15 determine wake-up time based on previously selected program content and user initiated power on events. If a power-on event(s) was detected for later in the current day, control will fall through to logic block 14D YES which will transfer control to logic block 14E select wake-up time based on previous wake-up times for current day. After logic block 14E or 15 has determined a wake-up time and day of the week control will be transferred to logic block 17 send power-down to sleep function. Logic block 17 will format power down command 18 and send the command to logic block 19 remove power to all subassemblies, processor(s) and RAM subassemblies.

Figure 6:
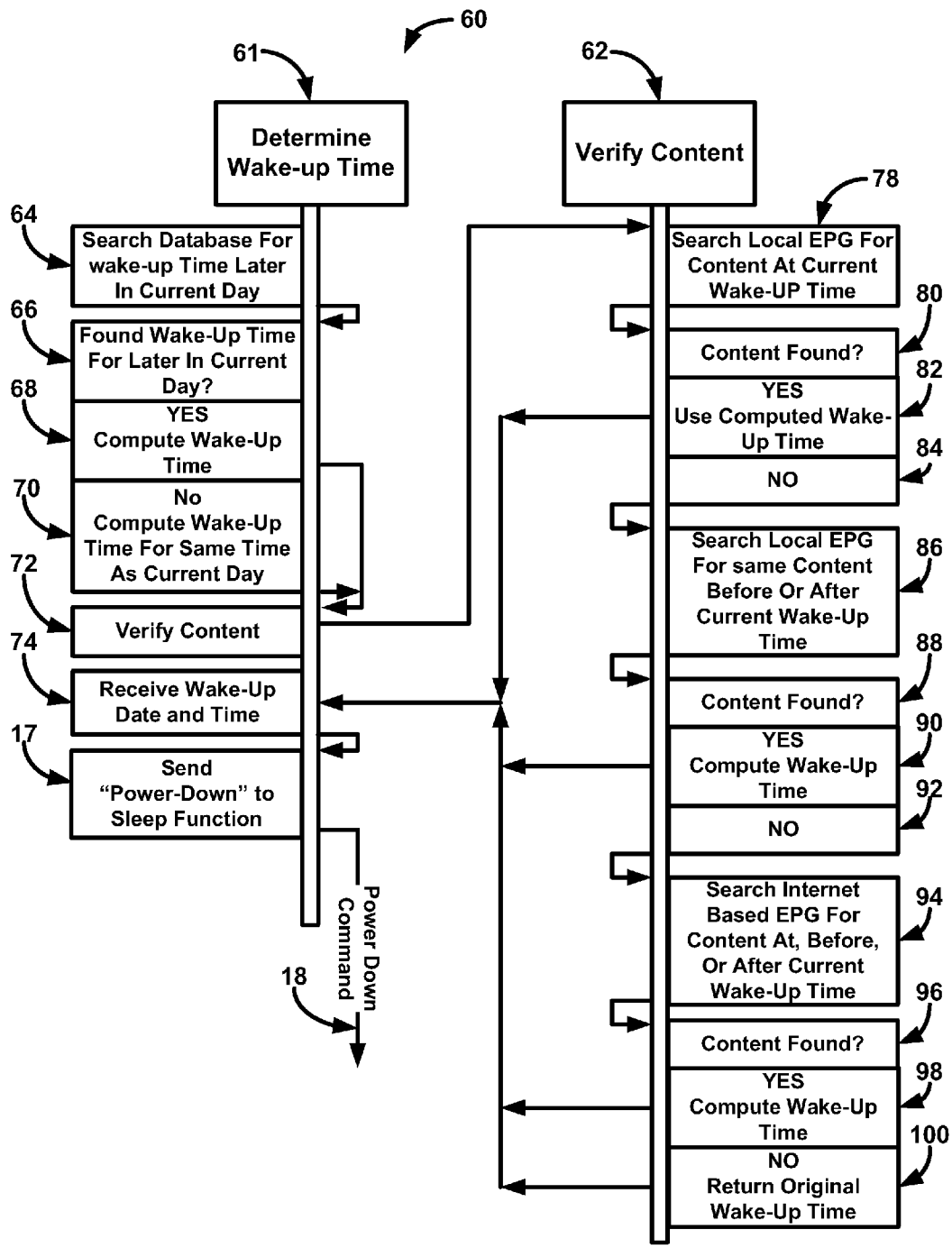
FIG. 6 is a depiction of an embodiment where a wake up time has been determined then the expected content for that wake up time is verified by searching a local EPG then an internet based EPG.

Now referencing FIG. 6 where 60 depicts an embodiment where logic block 15 (FIGS. 1A and 1B) determines a wakeup time and verifies the content to be viewed for the next wake-up event. In this depiction, logic block 64 searches the database for previous wake-up event for the current day of the week over some previous predetermined period. After logic block 64 searches the database control is transferred to logic block 66 found wake-up time for later in current day? If wake-up events for later in the current day of the week are found in the database history, control will fall through to logic block 68 YES compute wake-up time which then transfers control to logic block 72 verify content. If wake-up events are not found for later in the current day of the week in the database history, control falls through to logic block 70 NO compute wake-up time for same time as current day. In this case, the wake-up time is computed for the next day as would normally be computed after which control will be transferred to logic block 72 verify content. For the case where a wake-up time is computed for later in the current day (logic block 68), control is also transferred to logic block 72, verify content.

Logic block 72, verify content, transfers control along with the computed wake-up time and the expected content to logic block 78 search local EPG for content at current wake-up time. Televisions with digital tuners receive over the air data in the form of PSIP (Program and System Information Protocol) which have electronic programing data that televisions form into a local electronic programming guide (EPG). Logic block 78 searches the content at the wakeup time location in the EPG. After the search, control will fall through to logic block 80 content found? If the content at the computed wake-up time is the same as the determined content (determined at logic block 66), control will fall through to logic block 82 YES use compute wake-up time. The wake-up time as determined by the EPG is computed after which control transfers to logic block 74, receive wake-up date and time. If the content in the local EPG did not match the content determined by logic block 68, control will fall through to logic block 84 NO after which control is transferred to logic block 86 search local EPG for same content before or after current wake-up time. Logic block 86 searches the local EPG for the determined content both before and after the wake-up time as computed by logic block 68 after which control will transfer to logic block 88, content found? If the determined content was found in the local EPG either before or after the computed wake-up time (logic block 68), control will fall through to logic block 90 YES compute wake-up time. This covers the case where the computed wake-up time was a few minutes before or 30 or 60 minutes after the normal start time. For example, the computed wake-up time may have been 6:55 am and the content would not normally start until 7:00 am. After the new wake-up time has been computed, control is transferred to logic block 74 receive wake-up date and time.

If the content was not located by the search performed by logic block 86, control is transferred to logic block 92 NO after which control is transferred to logic block 94, search internet based EPG for content at, before, or after current wake-up time. Most cable TV providers and satellite providers host on-line internet based EPGs in addition to commercial EPGs provided by companies such as ZAP2IT.COM™. Depending on the provider of the TV content, logic block 94 selects one EPG provider from the plurality of possible EPG providers and perform the search for the content.

After logic block 94 performs its search, control is transferred to logic block 96 Content Found? If the content was located, control falls through to logic block 98, YES compute wake-up time. If this was the case, logic block 98 computes the wake-time and date then transfer control to logic block 74, receive wake-up date and time. If the content was not located, control falls through to logic block 100, NO return original wake-up time. Logic block 100 transfers control to logic block 74, receive wake-up date and time. Logic block 74, receives wake-up date and time makes an entry in the database for the wake-up date and time then transfer control to logic block 17, send "power-down" to sleep function. Logic block 17 will format the power down command 18 and send that command to logic block 19 (FIGS. 1A and 1B), remove power to all subassemblies, processors, and RAM subassembly.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, while this describes operating with a television, more generally, this can be used on any kind of device that displays videos, such as television sets, Set top boxes, Game consoles, Tuner dongles, Personal computers, and any other device having the ability to display AV content.

Also, this could be used with other kinds of devices, such as radios, household appliances, and any other device which consumes power and produces an output.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising:
an electronic device, which operates to produce an output, said electronic device having first and second electronic subsystems which collectively operate to produce said output;
said electronic device controlled by a processor, to produce said output, said processor also operating to determine a period of time where no output is being produced, and to maintain said first electronic subsystem and said second electronic subsystem into a power reduced state, and
said electronic device maintaining a database of times when said electronic device is likely to operate to produce said output, and automatically removing said first electronic subsystem from said power reduced state, and not removing said second electronic subsystem from said power reduced state at one of said times in said database, and without an indication from a user of the electronic device.

2. The device as in claim 1, wherein said database of times includes times when the user has previously turned on the device.

3. The device as in claim 2, wherein said electronic device automatically writes into said device dates and times when the user turns on the device.

4. The device as in claim 1, wherein said database of times includes times of high priority events that have been received over a network.

5. The device as in claim 1, wherein the device is a television.

6. The device as in claim 4, wherein the device is a television, and the network is a network that provides an electronic program guide.

7. The device as in claim 5, wherein the database also stores channels, and the television automatically turns on to a most likely channel.

8. The device as in claim 5, wherein said first electronic subsystem is a controlling subsystem and said second electronic subsystem is a screen of the television.

9. The device as in claim 1, wherein the power reduced state is a sleep state.

10. The device as in claim 1, wherein said database of time also includes content, and the device turns on automatically to a specified content type based on said database.

11. The device as in claim 1, wherein said database of times is populated based on previous wake up times if there are no times set for a current day.

12. The device as in claim 11, wherein said times that are populated based on previous wake up times are compared against information about content from an electronic program guide.

13. A system comprising:
a television device, which operates to produce an output for display;
said television device having a processor that determines a period of time where no output is being produced, and maintains at least part of said television device in a power reduced state during said time while no output is being produced, and
said television device receiving information indicative of high priority events over a network connection, and automatically removing at least part of said television device from said power reduced state at a time prior to said high priority events, said time prior to said high priority event being measured relative to said high priority event, and said automatically removing being carried out without an indication from a user of the television device.

14. The system as in claim 13, wherein the television device includes a first electronic subsystem for driving a display device, and a second electronic subsystem including at least a display for the device, and where said at least part of the television that is automatically removed from the power reduced state includes the first subsystem but does not include the second subsystem.

15. The system as in claim 13, wherein said information indicative of said high priority events is stored in a database, and said database also includes times when the user has previously turned on the device and the system automatically removes said at least part of the television device from said power reduced state at times that are measured relative to when the user has previously turned on the device.

16. The system as in claim 15 wherein the television device is turned on at a same time of a different day from when the user has turned on the television previously.

17. The device as in claim 16, wherein said television device automatically writes into said television dates and times when the user turns on the device.

18. The device as in claim 13, wherein the network is a network that provides an electronic program guide for the television device.

19. The device as in claim 13, wherein the information about high priority event also includes channel numbers and times.

20. The device as in claim 13, wherein the power reduced state is a sleep state.

21. The device as in claim 15, wherein said database also includes content, and the device turns on automatically to a specified content type as stored on said database.

22. The device as in claim 15, wherein said database is populated based on previous wake up times if there are no times set for a current day.

23. The device as in claim 22, wherein said times that are populated based on previous wake up times are compared against information about content from an electronic program guide.

24. A method of operating an electronic device, comprising:

operating first and second electronic subsystems which collectively operate to produce an output to be viewed by a user;

using a processor for controlling said electronic device to produce said output;

determining a period of time where no output is being produced, and maintaining said first electronic subsystem and said second electronic subsystem into a power reduced state during said period of time; and maintaining a database of times when said electronic device is likely to operate to produce said output, and automatically removing said first electronic subsystem from said power reduced state, and not removing said second electronic subsystem from said power reduced state at one of said times in said database, and without an indication from a user of the electronic device.

* * * * *